May 12, 1925.
E. L. SCHUMACHER ET AL
1,537,144
TEMPLE
Filed April 12, 1923
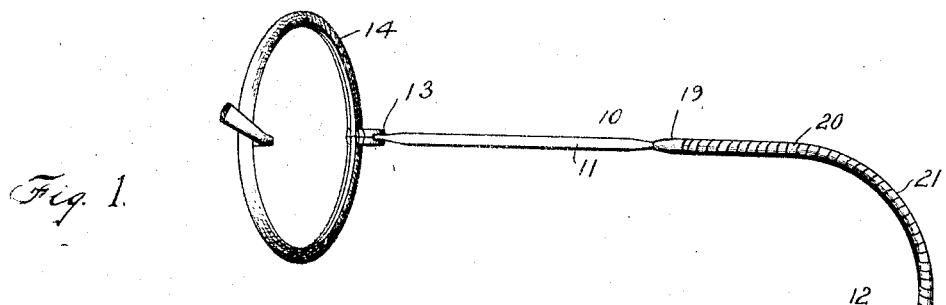
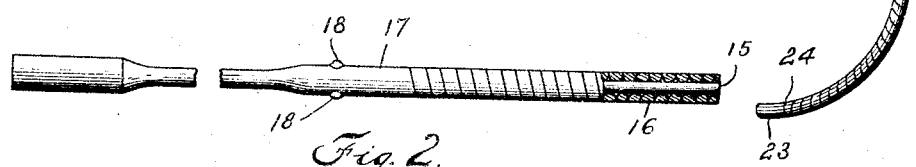
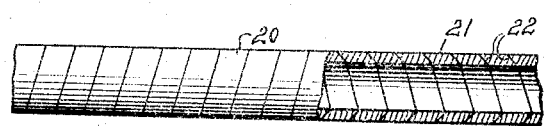
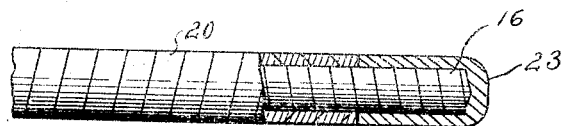
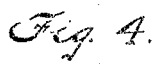
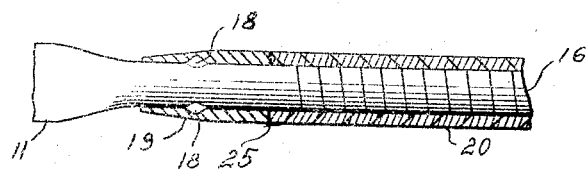
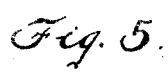
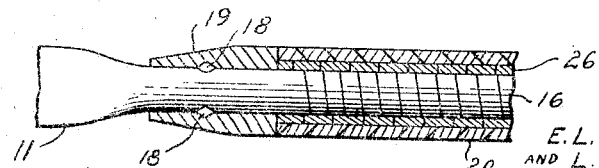
INVENTORS
E. L. SCHUMACHER
AND L. POETON.
BY
Harry H. Styll.
ATTORNEY Patented May 12, 1925.

1,537,144

UNITED STATES PATENT OFFICE.

ELMER L. SCHUMACHER AND LAWRENCE POETON, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

TEMPLE.

Application filed April 12, 1923. Serial No. 631,517.

*To all whom it may concern:*

Be it known that we, ELMER L. SCHUMACHER and LAWRENCE POETON, citizens of the United States, residing at Southbridge, in the county of Worcester and State of Massachusetts, have invented certain new and useful Improvements in Temples, of which the following is a specification.

This invention relates to improvements in temples, and has particular reference to temples for combination metal and zylonite spectacle frames.

At the present time spectacles having combination metal and zylonite frames are very much in vogue, the temples of these spectacles preferably having zylonite ear loops. The objection to such ear loops heretofore made is that they do not hold their shape because zylonite has the peculiar property of returning to its initial set. The zyl. covered ear loop is desirable because it can be made of sufficient thickness to prevent injury to the skin of the wearer without being unduly heavy in weight and the nature of its surface is such as to be comfortable and will not be affected by perspiration. In our invention we have eliminated the objectionable features of zylonite temples while retaining their advantages.

One object of the present invention is to produce a temple having a metal side piece and a zylonite covered ear loop, which may be formed to a desirable shape, and which will maintain this shape.

Another object of the invention is to provide a metal temple having a zylonite covered ear loop of sufficient resiliency to be comfortable, while securely holding the glasses in position.

A further object is to provide a temple having a zylonite covered ear loop which will not cut or abrade the skin or catch the hair of the wearer.

A further object is to provide a novel method of fastening a zylonite ear loop to a metal temple.

Other objects and advantages will be apparent from the following description taken in connection with the accompanying drawings, wherein is shown the preferred embodiment of the invention.

In the drawings:

Figure 1 is a perspective view showing the improved temple in association with an eyeglass frame.

Figure 2 is a side elevation of the metal side piece and core partially in section.

Figure 3 is a detail view of the zylonite covering.

Figure 4 is a side elevation partially in section, showing the zylonite in association with the core, and illustrating the method of securing the zylonite to the extreme end.

Figure 5 is a detail view partially in section, illustrating the manner in which the inner end of the zylonite is secured to the side piece.

Figure 6 is a longitudinal sectional view illustrating a modification.

Similar reference characters designate corresponding parts throughout the several views.

Our improved temple 10 comprises a substantially straight side member 11 and an ear loop 12, the member 11 being hingedly connected as at 13 to an eyeglass frame 14 of any ordinary or preferred construction. The side piece 11 is provided with a reduced portion 15 extending rearwardly, this reduced portion being surrounded by a metal cable 16, which may be secured by swaging, soldering, or any other preferred manner. Adjacent its rear end the side member 11 has an inflexible portion 17 which is provided with lugs 18 projecting on each side, as clearly shown in the drawings.

A tapered bushing 19 of zylonite or other composition material surrounds the body portion 17 and is held against rotation by the lugs 18. This bushing 19 may be assembled by rolling or in any other manner. The body portion 17 extends slightly beyond the tapered bushing 19, and this rearwardly extending portion is surrounded by a zylonite casing 20, which extends continuously over the cable 16. The casing 20 is preferably composed of material having straight outer sides 21 and parallel angularly disposed edges 22, such that the adjoining edges of the different turns of the material will overlap one another. From this it will be evident that since the adjacent turns of the cable so formed have angularly disposed comating edges, the joints will not open up when the whole is flexed. The cable 16 extends partially beyond the zylonite covering 20 and is provided with a cylindrical tip 23 which is also of zylonite; the tip 23 may be "iced or screw-threaded to the cable 16 and its inner end is cemented to the end of the casing 20 at 24. Due to the fact that the inflexible portion 17 extends into the zylonite casing 20, there will be no flexure of the casing 20 at the joint 25 where it is secured, as by cement, to the bushing 19. This insures a strong joint which will not pull loose from twisting or other wear.

In the modification shown in Figure 6, an intermediate winding 26 is provided between the flexible cable 16 and the outer zylonite casing 20. The material of this winding 26 is preferably zylonite, but is rectangular in cross section and is preferably cemented to the inner side of the casing 20. This intermediate winding 26 is wound oppositely from the casing 20 which adds resiliency to the entire combination, as well as giving additional mechanical strength.

From the foregoing description it will be evident that we have produced an improved temple wherein the ear loop is covered with zylonite, which is so constructed that it may be formed into any desired shape, and such that it will maintain its shape. We have used the word zylonite throughout the specification merely as illustrative of the qualities desired in this material. By the use of that word we mean a composition material which will simulate tortoise shell in appearance, but we do not limit ourseves to zylonite specifically because other composition materials may be used to equal advantage. Furthermore, we do not limit ourselves to the exact details of construction illustrated and described, but reserve the right to make changes falling within the scope of the claims without departing from the spirit of the invention.

Having thus described the invention, what we claim is:

1. A spectacle temple, comprising a straight metal side piece, a flexible cable secured to the rear end thereof, a spirally wound composition cover on said cable, the material of said cover having overlapping edges, and means for securing the cover to the cable and side piece.

2. A temple having a substantially inflexible metal side piece, a rearwardly extending flexible cable secured thereto, a helically wound strip of composition material covering said flexible cable, and a portion of the inflexible side piece, said composition material having angularly disposed comating edges, and means for securing the composition covering in place.

3. A temple of the character described, comprising a side piece having a flexible extension on one end, a plurality of oppositely wound helical coils covering said flexible extension, the outer coil being of composition material of such a cross sectional configuration that the edges of adjoining turns will overlap, means for securing the outer end of the composition covering to the extremity of the flexible extension, and means for securing the inner end of the covering to the side piece.

4. In a temple of the character described, a side piece having a substantially inflexible body portion and a rearwardly disposed flexible extension secured thereto, lugs projecting from the side of the body portion adjacent its rear end, a composition bushing secured to the body portion and held by said lugs, the body portion extending slightly beyond said bushing, a spiral winding of composition material secured to the bushing and covering the flexible extension, said composition material having intermeshing edges, and a cylindrical composition tip secured to the outer end of the flexible extension and the outer end of the spiral winding of composition material.

ELMER L. SCHUMACHER.
LAWRENCE POETON.